United States Patent
Iseli et al.

(10) Patent No.: US 10,030,972 B2
(45) Date of Patent: Jul. 24, 2018

(54) CALIBRATION OF A COORDINATE MEASURING MACHINE USING A CALIBRATION LASER HEAD AT THE TOOL CENTRE POINT

(71) Applicant: HEXAGON TECHNOLOGY CENTER GMBH, Heerbrugg (CH)

(72) Inventors: Claudio Iseli, Au (CH); Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 25 days.

(21) Appl. No.: 15/100,218

(22) PCT Filed: Nov. 28, 2014

(86) PCT No.: PCT/EP2014/075932
§ 371 (c)(1),
(2) Date: May 27, 2016

(87) PCT Pub. No.: WO2015/079019
PCT Pub. Date: Jun. 4, 2015

(65) Prior Publication Data
US 2017/0010094 A1 Jan. 12, 2017

(30) Foreign Application Priority Data
Nov. 28, 2013 (EP) .................................... 13194919

(51) Int. Cl.
*G01B 5/00* (2006.01)
*G01B 21/04* (2006.01)
*G01B 5/008* (2006.01)

(52) U.S. Cl.
CPC ........... *G01B 21/042* (2013.01); *G01B 5/008* (2013.01)

(58) Field of Classification Search
CPC .... G01B 5/008; G01B 11/005; G01B 21/045; G01B 21/047; G01B 3/008; G01B 7/008; G01B 21/04; G01B 21/042; G01B 5/0009
(Continued)

(56) References Cited

U.S. PATENT DOCUMENTS 5,198,874 A * 3/1993 Bell ...................... G01B 11/005
                                                   356/500
5,739,907 A * 4/1998 Chen .................... G01B 11/306
                                                   356/498
(Continued)

FOREIGN PATENT DOCUMENTS

CN          1651858 A      8/2005
DE       199 47 374 A1     5/2001
(Continued)

OTHER PUBLICATIONS

European Search Report dated Feb. 18, 2014 as received in Application No. 13194919.

*Primary Examiner* — Yaritza Guadalupe-McCall
(74) *Attorney, Agent, or Firm* — Maschoff Brennan

(57) ABSTRACT

Some embodiments of the invention include a calibration method for a coordinate measuring machine. In some embodiments, the method may include emitting and directing the laser beam towards a first of the set of retro-reflectors, whereby a measuring path is defined by the orientation of the laser beam, moving the calibration laser head along the measuring path so that the laser beam is kept directed towards the first retro-reflector according to the measuring path and the reflected laser beam is continuously received at the calibration laser head, measuring the change in distance to the first retro-reflector at a plurality of measuring positions along the measuring path and gathering a machine position for each of the plurality of measuring
(Continued)

positions, the machine position relating to a position of the tool carrier relative to the base.

22 Claims, 4 Drawing Sheets

(58) Field of Classification Search
USPC .......................................................... 33/503
See application file for complete search history.

(56) References Cited

U.S. PATENT DOCUMENTS

| | | | |
|---|---|---|---|
| 7,171,320 B2 | 1/2007 | Ogura et al. | |
| 8,031,331 B2 | 10/2011 | Meier et al. | |
| 2005/0024649 A1* | 2/2005 | Tsai | G01B 21/042 |
| | | | 356/614 |
| 2015/0233742 A1* | 8/2015 | Vokinger | G01B 11/14 |
| | | | 324/207.24 |
| 2017/0010094 A1* | 1/2017 | Iseli | G01B 21/042 |

FOREIGN PATENT DOCUMENTS

| | | | | |
|---|---|---|---|---|
| DE | 10 2007 004 934 A1 | 7/2008 | | |
| DE | 10 2007 041 827 A1 | 3/2009 | | |
| EP | 0 919 830 A2 | 6/1999 | | |
| EP | 1971821 B1 | 9/2008 | | |
| EP | 1 990 605 A2 | 11/2008 | | |
| EP | 2 390 737 A2 | 11/2011 | | |
| EP | 2878920 A1 * | 6/2015 | ........... G01B 21/042 |
| FR | 2 981 743 A1 | 4/2013 | | |
| GB | 2 276 455 A | 9/1994 | | |
| WO | 88/06714 A1 | 9/1988 | | |

* cited by examiner

CALIBRATION OF A COORDINATE MEASURING MACHINE USING A CALIBRATION LASER HEAD AT THE TOOL CENTRE POINT

FIELD OF THE INVENTION

The present invention generally pertains to a method for generation of calibration data for a coordinate measuring machine (CMM) by help of a guided laser emitting unit and a number of fixed retro-reflectors, wherein changes in distance between the laser emitter and a respective retro-reflector are determined.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe) carried by the probe head.

In a simple form of the machine a suitable transducer mounted parallel to each axis is able to determine the position of the probe head relative to a base of the machine and, therefore, to determine the coordinates of a measurement point on the object being approached by the sensor. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with high measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite or other stiff materials also makes the machine and the movable frame elements quite heavy. The high weight on the other side also requires high forces for a decent acceleration.

However, weight reduction is a main topic relating to the designs of coordinate measuring machines, as if the machine components are built comprising less weight (and less stiffness) faster positioning of respective components can be achieved by causing fewer force affecting the coordinate measuring machine. On the other hand the influence of machine vibrations and torsions caused by reduced stiffness and (faster) movement of the machine components increase with weight reduction of these parts. Thus, uncertainties of derived measurement values and errors occurring from such deformations and vibrations increase accordingly. Therefore, especially with view to weight reduction but also for conventional machines, an accurate error handling is an important aspect.

For both approaches (heavy and light weight) an initial calibration procedure of the respective CMM is necessary particular for determining static and repeatable errors of the respective system. For maintaining stable and accurate measuring requirements, such a calibration preferably is to be executed in defined intervals due to taking account of external influences affecting the measuring system over time, e.g. changes of environmental parameters (temperature, humidity etc.) or mechanical impacts.

The calibration of a CMM may provide an improvement of a model which describes the static and/or dynamic behaviour of the CMM under certain conditions. Thereby, current calibration parameters may be used for actualising the defined model in order to more precisely—and adapted to current conditions—describe the behaviour of the CMM.

Typically, a so called compensation map is derived by the calibration procedure, wherein the map provides a compensation of each measuring value, which is acquired by measuring a measuring point of an object. Such a map may be designed as a kind of look-up table, i.e. for every coordinate or for defined coordinate steps of each axis of the CMM a corresponding compensated value is provided and an originally measured value is replaced by the compensated one. Alternatively, specified equations are determined and the equations are applied to measured position values for calculation of corresponding corrected values, thus providing a kind of compensation map.

There are several techniques and methods known for respective calibrations of a coordinate measuring machine. According to one known procedure, a distance measuring device—particularly a device providing distance measurement by a laser beam—is located on the base of a CMM and distances are measured to a target, the target being attached to the probe head of the CMM and being moved along a defined path, whereby respective distances and machine coordinates are derived at designated positions along the path. Geometric errors of the measuring machine are determined on basis of the measured distances and machine coordinates are acquired by the machine. Such a method for instance is disclosed in the European patent application EP 1 990 605.

Disadvantageously, for determination of precise calibration parameters for the whole measuring volume of the CMM, the laser device has to be set successively to different positions within the measuring volume and a number of measurements for several directions of the laser beam have to be performed. Thus, a highly educated operator, which is specifically trained on the calibration procedure, has to relocate the laser device several times accordingly and has to control and/or monitor the procedure as a whole. Therefore, as the proposed procedure needs to be monitored and manually controlled, that procedure is very time consuming and quite expensive.

A similar approach, however located in the different technical field of processing machines and thus relating to quite different requirements concerning machine design and measuring precision, is known from the EP 2 390 737, wherein an emitter is located at the tool head and reflectors are positioned at the processing machine.

Another calibration method for a CMM is known from German patent DE 199 47 374 (so called "Etalon Laser Tracer"). According to that method again a target (i.e. a reflecting member) is arranged at the probe head of the CMM. Moreover, at least one laser tracker is provided for determining the position of the target and to continuously track the target. The target is moved according to a predetermined path and measurements are performed at designated positions, wherein a position of the target is determined by the laser tracker and respective coordinates are derived by the CMM. That procedure is repeated several times, wherein each time the laser tracker is located at a different position and measurements are performed at identical designated positions.

Geometric deviations and corresponding correction values are derived on basis of the CMM coordinates and corresponding positions determined by the laser tracker. A hardware setup proposed to be used for that calibration method is described in more detail in EP 0 919 830.

Here, too, as the calibration as a whole is a quite complex procedure (setting up the laser tracker at different position and performing respective measurements at identical CMM-positions), one big disadvantage of that calibration method is the facts that the calibration is to be executed by a specifically educated person. Moreover, providing that method is comparatively very expensive and time consuming, as at least one precise laser tracking device is needed and that device is to be placed at different precisely-known positions. Alternatively, more than one laser tracker is provided, which makes the method even more expensive.

SUMMARY

Some embodiments of the present invention provide an improved method for calibration of a coordinate measuring machine, wherein the calibration process is executed mainly automatically, particularly without need of monitoring the process by a user.

Some embodiments of the invention provide such calibration, wherein the calibration, i.e. the equipment for calibration, is comparatively cheap and the execution of the process as a whole is comparatively little time consuming.

Some embodiments of the invention provide a precise calibration for the whole measuring volume of the respective CMM.

The invention relates to a calibration method for a coordinate measuring machine (CMM). The coordinate measuring machine comprises a drive mechanism for moving a tool carrier relative to a base for approaching a measurement point and a calibration laser head implemented so and attached to the tool carrier so that a laser beam, which is emittable by the calibration laser head, is swivelable around at least two basically perpendicular axes and that changes in distance are measurable interferometrically by means of the calibration laser head. Additionally, a set of retro-reflectors is arranged in fixed positions relative to and/or onto the base of the CMM.

The method according to the invention comprises
emitting and directing the laser beam towards a first of the set of retro-reflectors, whereby a measuring path is defined by the orientation of the laser beam,
moving the calibration laser head along the measuring path so that the laser beam is kept directed towards the first retro-reflector according to the measuring path and the reflected laser beam is continuously received at the calibration laser head,
measuring the change in distance to the first retro-reflector at a plurality of measuring positions along the measuring path and
gathering a machine position for each of the plurality of measuring positions, the machine position relating to a position of the tool carrier relative to the base, particularly wherein machine coordinates corresponding to drive positions of the drive mechanism are gathered.

The coordinate measuring machine generally is designed for determining position information (coordinates) for at least one measurement point of an object to be measured with a measuring tool being attachable to the tool carrier (instead of the calibration laser head, i.e. the laser calibration head is exchangeable by a measuring tool).

Advantageously, the solution according to the invention is an absolute low-cost one. The needed hardware (reflectors and interferometer) is not expensive and the improvement of calibration time (i.e. less calibration time) is very important as it leads to significant cost reductions. The cost reduction on the hardware is also given for instance by the fact that there is no need for a specific continuous two axis precise mechanics and its corresponding drive (compared to the above-mentioned Etalon system). Moreover, as the system and its components are built up quite simple, maintenance cost can be kept comparatively low.

Contrary to a CMM calibration system according to the prior art, here no external tracking system is needed in order to determine positions e.g. of the probe head or reflectors, as such is realised with the CMM itself.

The retro-reflectors of the set of retro-reflectors are embodied as prismatic and/or spherical reflectors and/or as any other type of retro-reflecting member known from prior art being designed for reflecting an impinging laser beam in opposite direction, particularly with an offset.

According to an embodiment of the invention, calibration data for the coordinate measuring machine is derived depending on the measured change in distance and the machine position for each of the plurality of measuring positions. Thus, for each of the plurality of measuring positions a relative distance value and machine-based position information is provided as calibration data.

According to an embodiment of the invention, the determination of machine errors is performed based on the following principle:

When setting the laser calibration head to a succession of measuring point along a first measuring path (in a first direction j=1), for each point a vector $P_{i1}$ is acquired, the components of which are the point coordinates acquired by the CMM (machine coordinates) and containing errors due to an error parameter u, and an abscissa $I_{i1}$ of each point is acquired, with respect to an origin, measured interferometrically and which may be assumed accurate. The origin may be selected arbitrarily along the measuring path.

Particularly, for comparing vector $P_{i1}$ with $I_{i1}$ respective translations and/or rotations are performed in order to express both in a common reference system.

The laser beam is then directed to a next (second) reflector defining a next (second) measuring path and, afterwards, to further reflectors with further measuring paths. Alternatively, the second measuring path is defined by still directing the laser to the first reflector but with new orientation.

The error parameters u are then calculated by minimising, an error function defined by the sum of the differences, for each point, between vector $P_{ij}(u)$ (affected by error) and (rotated-translated) vector $I_{ij}$ in the reference system of the CMM:

$$\min_{u, Rj, tj} \sum_{ij} \| P_{ij}(u) - R_j I_{ij} - t_j \|^2$$

where:
$P_{ij}(u)$ represents the machine coordinates of the i-th measuring point on the j-th measuring path, depending on error parameters u;

$I_{ij}$ represents the coordinates of the points whose abscissas, with respect to a common origin, are acquired by the interferometer, in the reference system integral with it; and $R_j$ and $t_j$ represent, respectively, the rotation matrix and the translation vector by which to convert vectors $I_{ij}$ to the machine reference system (N.B. there is one matrix $R_j$ and one vector $t_j$ for each direction j of the laser beam).

Approaches for calculating machine errors, however with different hardware setup, are disclosed in EP 1 990 605. Applying these calculation methods on a calibration method according to the invention lies within the scope of the present invention.

According to a further embodiment of the invention, an automatic laser aligning functionality is executed (for performing the calibration method), wherein an impinging position of the reflected laser beam on side of the calibration laser head is determined and the position and/or orientation of the calibration laser head is adapted based on the impinging position, particularly wherein the position and/or orientation of the calibration laser head is adapted so that the laser beam impinges on the centre of the respective retro-reflector.

Such alignment of the laser beam with respect to the centre of one of the retro-reflectors is particularly realised by a positions sensitive detector (PSD) integrated in the calibration laser head.

According to an embodiment of the invention, the measuring path defined by the direction of the laser beam provides a defined offset regarding at least one of the two axes, particularly regarding a vertical Z-axis, and/or the direction of laser beam is adjusted with respect to three rotatory degrees of freedom. In that context the offset of the measuring path from one of the at least two axes is to be understood so that the measuring path does not intersect the respective axis. In a home position of the calibration laser head an initial measuring path is defined parallel to a first and perpendicular to a second axis.

The calibration method according to the invention may be performed in a dynamic manner, wherein the steps of measuring the change in distance to the first retro-reflector for each of the plurality of measuring positions and gathering the machine position for each of the plurality of measuring positions are performed while moving the calibration laser head, in particular with constant speed. Such dynamic calibration also provides for extraction and calculation of dynamic compensation parameters (dynamic calibration data).

Alternatively, the method is performed in a static manner, wherein the steps of measuring the change in distance to the first retro-reflector and gathering the machine position for each of the plurality of measuring positions are performed at defined rest positions of the calibration laser head.

As a further alternative, the calibration method according to the invention may be performed in a hybrid manner, wherein the calibration method is performed in the dynamic manner for a first part of the plurality of measuring positions and in the static manner for a second part of the plurality of measuring positions.

With respect to an autonomous calibration of the CMM, particularly the position of at least one reflector of the set of retro-reflectors is pre-known and/or the calibration method is performed automatically, particularly after providing a starting command, particularly wherein the method steps are performed in autonomously controlled manner.

Advantageously, according to the invention, the whole calibration process can be automated. After having equipped the CMM with the laser emitting head and several reflectors, the complete calibration process can run automatically, during the night for example, even collecting much more information than with solutions known from the prior art. Knowing the positions of the reflectors, improves precision and efficiency of such automatic calibration.

Moreover, for performing the calibration method, no metrology skills of an operator of the CMM are needed. Thus, a reduction of training cost is achieved as the system and calibration can be run fully automated.

According to a specific embodiment of the invention, a compensation map is calculated based on the measured change in distance for each of the plurality of measuring positions and the machine position for each of the plurality of measuring positions for compensating a position information which is determined for the at least one measurement point, particularly wherein the compensation map provides deriving compensated position values for respective machine positions which are gathered by conducting a measuring mode.

The measurement point particularly is determined by execution of a measuring functionality in order to measure a surface of an object with the CMM. For such object-measurement a measuring tool is attached to the tool carrier, wherein the tool provides measurement of positions in optical or tactile manner.

Concerning the compensation of machine errors more specifically, a set of compensation values is derived—according to an embodiment of the invention—for a set of positions within a measuring volume, the measuring volume representing a particular volume inside which a spatial coordinate of the measurement point is determinable as to a design of the coordinate measuring machine, wherein a position information which is determined for the at least one measurement point is compensable by applying respective compensation values.

Moreover, relating to an alternative embodiment with view to compensation, a compensation model is determined and/or a compensation equation is derived based on the measured change in distance and the machine position for each of the plurality of measuring positions, wherein the position information which is determined for the measurement point, particularly by executing a measuring mode, is fed to the compensation model or is processed using the compensation equation, respectively, and a compensated position information is derived from the compensation model or by applying the compensation equation respectively.

Now referring to the structural design of the CMM in context with the calibration method, the calibration laser head particularly is supplied with laser light for emitting the laser beam via an optical fibre which is connected to the calibration laser head, particularly wherein a laser source for generating the laser light is located structurally separated from the coordinate measuring machine and is connected to the optical fibre as well.

One further aspect regarding the provided calibration functionality is related to the arrangement of the interferometer. According to specific embodiments of the invention, an interferometer is associated with the calibration laser head for providing interferometric measurements of the changes in distance, in particular wherein the interferometer is linked to the calibration laser head by a beam path, particularly by the optical fibre, and/or the calibration laser head comprises an interferometer for measuring the changes in distance interferometrically. The interferometer may be integrated in a common housing with the calibration laser head. Either only the laser or also parts of the interferometer can be fibre coupled externally of the calibration laser head. Different embodiments are shown in EP 1971821 B1 for example.

According to a further inventive embodiment regarding the interferometric measurements of changes in distance, the calibration laser head comprises a reference surface providing a reference arm of an interferometer, wherein an interference for measuring the changes in distance is generated by superimposing a reference laser beam of the reference arm and the reflected laser beam (from the aimed reflector which), particularly wherein the reference and the reflected laser beam are superimposed externally. An external superimposition may be realised by transmitting both the laser beams (reflected and reference) to a structurally separated detection unit for measuring changes in distance, particularly for superimposing the laser beams.

According to further embodiments of the invention, the method steps (emitting, moving, measuring and gathering) are performed for at least the first and a second or more of the reflectors of the set of retro-reflectors, wherein the calibration data is derived on basis of the measurements of change in distance and the gathered machine position for each of the plurality of measuring positions for the at least first and second or more retro-reflectors.

Furthermore, the method steps particularly are performed repeatedly with directing the laser beam towards the same of the set of retro-reflectors, wherein different measuring paths are defined by respective different orientations of the laser beam.

Moreover, the laser beam particularly is emitted at a tool centre point (TCP) defined by the arrangement of the calibration laser head to the tool carrier, particularly wherein the tool centre point is defined by a centre of rotation regarding swiveling the calibration laser head, or the laser beam respectively, around the at least two axes.

The invention also relates to a coordinate measuring machine for determining position information for at least one measurement point of an object to be measured. The coordinate measuring machine comprises a drive mechanism for moving a tool carrier relative to a base for approaching the measurement point, a position providing unit for providing a machine position according to the position of the tool carrier relative to the base and a controlling and processing unit.

According to the invention, the CMM additionally comprises a calibration laser head implemented so and attached to the tool carrier so that a laser beam, which is emittable by the calibration laser head, is swivelable around at least two basically perpendicular axes and that changes in distance are measurable interferometrically by means of the calibration laser head. Furthermore, a set of retro-reflectors is arranged in fixed positions relative to and/or onto the base and a calibration functionality is provided executable by the controlling and processing unit. The calibration functionality is at least defined by emitting and directing the laser beam towards a first of the set of retro-reflectors, whereby a measuring path is defined by the orientation of the laser beam, moving the calibration laser head along the measuring path so that the laser beam is kept directed towards the first retro-reflector according to the measuring path and the reflected laser beam is continuously received at the calibration laser head, measuring the change of distance to the first retro-reflector at a plurality of measuring positions along the measuring path and gathering the machine position for each of the plurality of measuring positions by the position providing unit, particularly wherein machine coordinates corresponding to drive positions of the drive mechanism are gathered.

Particularly, the calibration functionality is adapted to generate calibration data, the calibration data depending on the measured change in distance and the machine position for each of the plurality of measuring positions and providing compensation of machine errors.

According to a specific embodiment of the invention, an optical fibre is provided for transmittance of laser light to the calibration laser head for emitting the laser beam, particularly wherein the laser light is generated by a laser source which is located structurally separated from the coordinate measuring machine and the optical fibre is connected to the calibration laser head and the laser source.

According to another specific embodiment of the invention, an interferometer is associated with the calibration laser head for providing measuring the changes in distance interferometrically, in particular wherein the interferometer is linked to the calibration laser head by a beam path, particularly by the optical fibre, and/or the calibration laser head comprises an interferometer for measuring the changes in distance interferometrically, and/or the calibration laser head comprises an impinging-detection unit for determining an impinging position of the reflected laser light relative to a reference position of the impinging-detection unit, particularly wherein the impinging-detection unit is designed as a position sensitive detector or device (PSD), particularly photo diode, or as a laser power sensor.

The calibration laser head—according to a further embodiment of the invention—is implemented so and is attached to the tool carrier so that the measuring path defined by the direction of the laser beam provides a defined offset regarding at least one of the two axes, particularly regarding a vertical Z-axis. Furthermore, the calibration laser head may be implemented so that the direction of laser beam is adjustable in three degrees of freedom by means of the calibration laser head, i.e. the laser beam is rotatable about three mutually perpendicular axes. Thus, adjusting of the direction of the laser beam is provided regarding three rotatory degrees of freedom.

According to a more specific embodiment of the invention the calibration laser head is designed being swivelable (relative to the tool carrier) around at least two basically perpendicular axes and comprises a reflecting member, particularly a mirror, providing the offset, particularly wherein the reflecting member is designed being swivelable around a third axis which is mutually perpendicular to the at least two perpendicular axes.

By that design, the laser beam particularly is pivotable around three perpendicular axes and thus, three degrees of freedom regarding the orientation of the laser beam are settable. The reflecting member and the calibration laser head itself preferably are pivotable motorised, wherein the calibration laser head comprises respective motorised pivoting means.

The reflecting member makes it possible to have the laser beam being offset from the Z-ram axis (i.e. that axis being defined by the tool carrier in vertical Z-direction), allowing to better measure rotational errors for the axis. For providing a precise compensation, it is also needed to work with different offsets. Those offsets particularly can be provided, by using a further reflecting member at the calibration laser head at a different distance to the laser emitting unit (Z-axis), wherein the reflecting member, which is arranged closer to the axis, is retractable from or pivotable into the beam path.

Furthermore, the invention relates to a system for calibration of a coordinate measuring machine. The coordinate measuring machine is built for determining position information for at least one measurement point of an object to be measured and comprises a drive mechanism for moving a tool carrier relative to a base for approaching the measurement point and a position providing unit for providing a machine position according to the position of the tool carrier relative to the base.

The system comprises a calibration laser head implemented so and attachable to the tool carrier so that a laser beam, which is emittable by the calibration laser head, is swivelable around at least two basically perpendicular axes and changes in distance are measurable interferometrically by means of the calibration laser head. The system further comprises a set of retro-reflectors being arrangeable in fixed positions relative to and/or onto the base and an optical fibre connectable to the calibration laser head for providing transmittance of laser light to the calibration laser head for emitting the laser beam.

Particularly, the system further comprises a laser source for generating laser light being transmittable via the optical fibre to the calibration laser head, the laser source being connectable with the optical fibre.

Moreover, the invention relates to a computer programme product having computer-executable instructions for controlling and executing a method as described above, in particular when run on a controlling and processing unit of a coordinate measuring machine or system as mentioned above.

BRIEF DESCRIPTION OF THE DRAWINGS

The method and the devices according to the invention are described or explained in more detail below, purely by way of example, with reference to working examples shown schematically in the drawings. Specifically.

DETAILED DESCRIPTION

Figure 1:
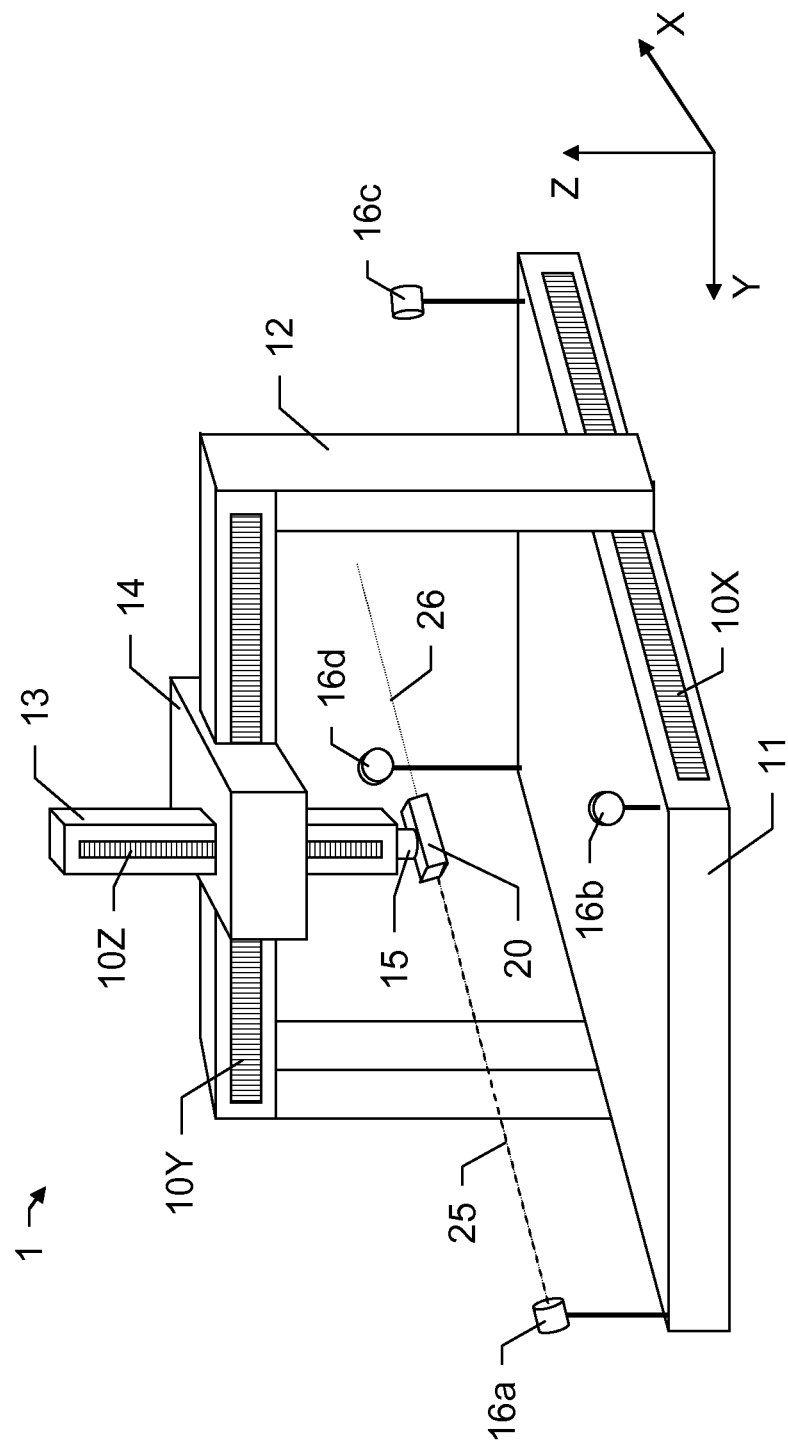
FIG. 1 shows an embodiment of a portal coordinate measuring machine with a calibration laser head and reflectors at the base according to the invention.

In FIG. 1 an exemplary embodiment of a portal coordinate measuring machine 1 (CMM) according to the invention is depicted, the coordinate measuring machine 1 comprises a base 11 and a frame structure for linking a tool carrier 15 (probe head 15) to the base 11, the frame structure comprising several frame components 12,13,14 being movable with respect to another. The first frame component 12 is a portal having two portal legs, which are connected by a bridging portion at their upper ends. Driven by a drive mechanism (not shown), the frame component 12 is capable to move along the longitudinal sides of the base 11. This direction corresponds to a first direction X. The movement of the frame component 12 particularly is performed by a gear rack attached to the base 11, which is meshing with a pinion on the frame component 12, but however may be realised alternatively according to solutions known from prior art.

A carriage 14 is movably arranged on the bridging portion of the frame component 12. The movement of the carriage 14 (which is to bee seen as a further frame component) may also be achieved by a rack and pinion. A vertical rod 13 (sleeve, Z-ram), building a further frame component, is movably incorporated into the carriage 14. At the bottom portion of the vertical rod 13 a tool carrier 15 is provided.

The tool carrier 15 is movable to any desired point in a measuring volume (work zone) of the coordinate measuring machine 1 in the directions X, Y and Z. The measuring volume is defined by the base 11 and the frame components 12,13 and in particular by the range of movability of the carriage 14. The three space directions X, Y and Z are preferably orthogonal to one another, although this is not necessary for the present invention. It should be noted that a drive mechanism and a controller for driving the frame components and, thus, for driving the tool carrier 15 are not shown.

The tool carrier 15, on which e.g. a stylus is attachable exemplarily, is fastened on the lower free end of the rod 13. The stylus is used in a manner known per se for touching an object to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the tool carrier 15 may be designed for arranging a contact probe, e.g. a scanning or touch trigger probe, or a non-contact probe, particularly an optical, capacitance or inductance probe, or an articulated probe.

Two of the most common types of bearings between the movable members and the guides are air bearings or ball bearings (e.g. linear circulating plus rails). The air bearings give the advantage that there is no friction in the movement (which may introduce different kind of errors like angle errors or hysteresis). The disadvantage of air bearings is that the stiffness is lower than in ball bearings, so that particularly dynamic errors may occur. In ball bearing types, the stiffness in the bearing system is typically higher but there is friction and the friction forces may introduce errors. However, the invention may be applied for at least both types of bearings.

Summed up, the coordinate measuring machine 1 is built for determination of three space coordinates of a measurement point on an object to be measured and, therefore, comprises three linear drive mechanisms for provision of movability of the probe head 15 (tool carrier 15) relative to the base 11 in the first, second and third direction (X, Y and Z direction) and particularly machine components providing additional rotatory degrees of freedom (e.g. articulated probe).

Each linear drive mechanism has a linear guide, one in the first, one in the second and one in the third direction (X, Y and Z direction), respectively. In a simple embodiment, the linear guide of the X-direction drive mechanism is formed by two edge-building surfaces of the base 11, the linear guide of the Y-direction drive mechanism is formed by two or three surfaces of the bridge and the linear guide of the Z-direction drive mechanism is formed by a cubical hole in the Y-carriage member.

Furthermore, each linear drive mechanism comprises a movable member being supported for movement along the guide by bearings. In particular, the movable member of the X-direction drive mechanism is embodied as X-carriage having mutually facing surfaces with respect to the above mentioned two guiding surfaces of the base 11. The movable member of the Y-direction drive mechanism is embodied as Y-carriage 14 having mutually facing surfaces with respect to the above mentioned two or three guiding surfaces of the bridge. And, the movable member of the Z-direction drive mechanism is formed by Z-column 13 (sleeve) having mutually facing surfaces with respect to the inner surfaces of the cubical hole in the Y-carriage.

Moreover, each linear drive mechanism comprises a linear measuring instrument for determination of a first, a second or a third drive position, respectively, of each movable member in the first, the second or the third direction (X, Y and Z direction), respectively.

In this exemplary embodiment of FIG. 1, the portal legs each have a movable X-carriage which allows movement of the first frame component 12 in X-direction.

A measuring scale 10X being part of the X-measuring instrument is schematically represented on the long side of the base 11, wherein the scale 10X extends parallel to the X-direction. The scale may be a glass measuring scale, e.g. having incremental or absolute coding, with which a drive position in the X-direction of the X-carriage can be determined. It is to be understood that the measuring instrument may furthermore contain suitable sensors for reading the measuring scale 10X, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10Y is arranged parallel to the Y-direction on the bridging portion of the first frame component 12. Finally, another measuring scale 10Z is also arranged parallel to the Z-direction on the Z-ram 13. By means of the measuring scales 10Y,10Z as part of the linear measuring instruments, it is possible to record the present drive positions of the second frame member 14 in Y-direction and of the sleeve 13 in the Z-direction metrologically in a manner which is known per se.

In the shown embodiment, the base 11 comprises a table with a granite surface plate, in particular the base is made of granite, for supporting the object to be measured, on which the space coordinates of at least one measurement point are intended to be determined.

Not shown is a controlling and processing unit, which is designed to actuate the motor drives of the coordinate measuring machine 1 so that the tool carrier 15 travels to the measurement point. The controlling and processing unit comprises a processor and a memory. In particular, the controlling and processing unit is designed for determining the three space-coordinates of the measurement point on the object as a function of at least the first, the second and the third drive position of the three drive mechanisms.

For manual operation, the control unit may be connected to a user console. It is also possible for the control unit to fully automatically approach and measure measurement points of the object to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine. Furthermore, a CMM in context with the present invention also is to be understood as a system for precise positioning and/or precise assembling of work pieces or tools and/or for applying materials. Such a system is designed to provide movement and measurement of positions within a working volume defined by the structure of the respective system and defines a coordinate system, within which positioning of system components with high precision is provided. For instance, a robot providing precise positioning and/or measuring abilities may be calibrated according to the invention.

The coordinate measuring machine 1 comprises a number of retro-reflectors 16a-d (here: four reflectors) positioned on the base 11 in different heights (Z-positions) for carrying out the calibration. A laser beam which impinges on one of the reflectors 16a-d is back-reflected parallel, particularly coaxial, relative to a propagation direction of the emitted laser light. The reflectors 16a-d are located near the borders of the measuring volume (e.g. of the base 11) or—according to an alternative embodiment which is not shown here—outside of the volume and may be placed on separate carriers, e.g. to avoid granite table deflexion effects due to the bridge position. The reflectors 16a-d, placed on the table, also could be equipped with tilt sensors to either generate a warning signal, e.g. for warning the user, if strong deflexions of the table occur (i.e. deflections exceeding a predefined threshold) or to correct the exact reflector centre point according to the measured tilts.

According to the invention, the laser beam 25 is emitted at a calibration laser head 20, which—according to the present embodiment—comprises an interferometer for determining changes in distance and which is attached to the tool carrier 15 for carrying out a calibration method in accordance with the invention.

Initially, the laser beam is directed onto a first retro-reflector 16a using the tool carrier 15 (by setting a specific solid angle of the laser head 20 and particular of an reflecting mirror of the laser head 20) and the direction of the light emission is fixed, whereby a measuring path 26 is defined by the propagation direction of the laser light. The path 26 particularly is originating from the centre of the reflector 16a and being parallel (coaxial) to the propagation direction of the laser light. That chosen direction is held stable during measuring several points along the measuring path 26.

After targeting the first reflector 16a measurement points need to be collected along the measuring path 26. For that, the CMM 1, i.e. the tool carrier 15 together with the calibration laser head 20, is moved to first theoretical measuring point on the path 26 and then is moved along the path. The lengths (changes in distance) measured by the laser by help of the interferometer, i.e. the distance between two theoretical points on the measuring path 26, and the positions derived by the CMM 1 (e.g. by help of the scale readings or respective position sensors connected to the drives) for these points are stored. Thus, there is derived a set of data comprising a change of distance (e.g. relative to a previous point or to a starting point) and the coordinates derived by the CMM 1 for that point for every point along the measuring path 26.

That movement and measuring may be carried out in a static manner, i.e. the movement is stopped for measuring the change in distance and for determining the CMM-position at a designated point, or in a dynamic manner, i.e. the measurements are performed during movement of the laser head 20 (e.g. with defined or constant speed).

After a predefined amount of points or a defined length of one measuring path is measured or is passed through the process of measuring distances and positions is repeated with a next of the retro-reflectors 16b-d and along a corresponding next measuring path. Alternatively, in that context, several measurements along several different measuring paths with different orientations provided by the same retro-reflector 16a can be performed, for instance in order to generate a greater amount of data sets and for enabling a more precise calculation of the calibration data.

By processing the positions of the CMM 1 together with the corresponding distance information for each point the calibration data for the CMM 1 is derived. Thus, the CMM error is extracted comparing the CMM measurement results to an accurate reference, i.e. here to the changes in distance due to measurements with the interferometer, and a corresponding compensation map is generated based thereon, which is used to correct all future measurements of objects.

In particular, an adjustment step takes place during the calibration process, wherein the calibration laser head 20 is moved until the laser beam 25 is centred on the reflector 16a. A position sensitive device (PSD) may be provided at the laser head 20 for detecting the impinging position of the reflected laser light and determining a deviation of the impinging emitted laser from the centre of the reflector 16a. Such adjustment may be performed continuously or e.g. for each measuring position. For instance, small Cartesian adjustments will be accomplished, to always centre the laser beam on the reflector with the help of the PSD or laser power measurements on side of the calibration laser head 20.

According to the invention, the current line orientation 26 (=measuring path 26) can be determined by knowing the position of the reflector 16a and the current position of the CMM tool carrier 15 (or the respective positions of the axes). This step may be necessary, as the direction set by the tool carrier 15 or the calibration laser head 20, respectively, and by the mirror of the laser head is not very accurate, but however needs to be absolutely stable for providing highly precise calibration data.

In particular, for large CMMs, a second search for the reflector's centre and re-calculating the orientation of the measuring path 26 at the end of the measuring path 26 may be performed to avoid an effect of inaccurate angles evaluation on long distances.

Moreover, according to a specific embodiment of the invention, a particularly automatic accuracy-check of a calculated and applied compensation map is provided by measuring along at least one additional measuring path and comparing the measuring results with the values provided by the compensation map. If the values deviate from each other, an adaptation of the map or re-calibration of the system may be performed.

Particularly, the amount of driven measuring paths 26 and the orientations of those paths are optimised in advance of the execution of the calibration process by a mathematical procedure. From this, the positions and numbers of required retro-reflectors 16a-d also are defined.

For providing the described calibration method, according to the invention, the controlling and processing unit of the CMM 1 comprises corresponding calibration functionality for controlling and respectively performing the above mentioned calibration steps.

Figure 2:
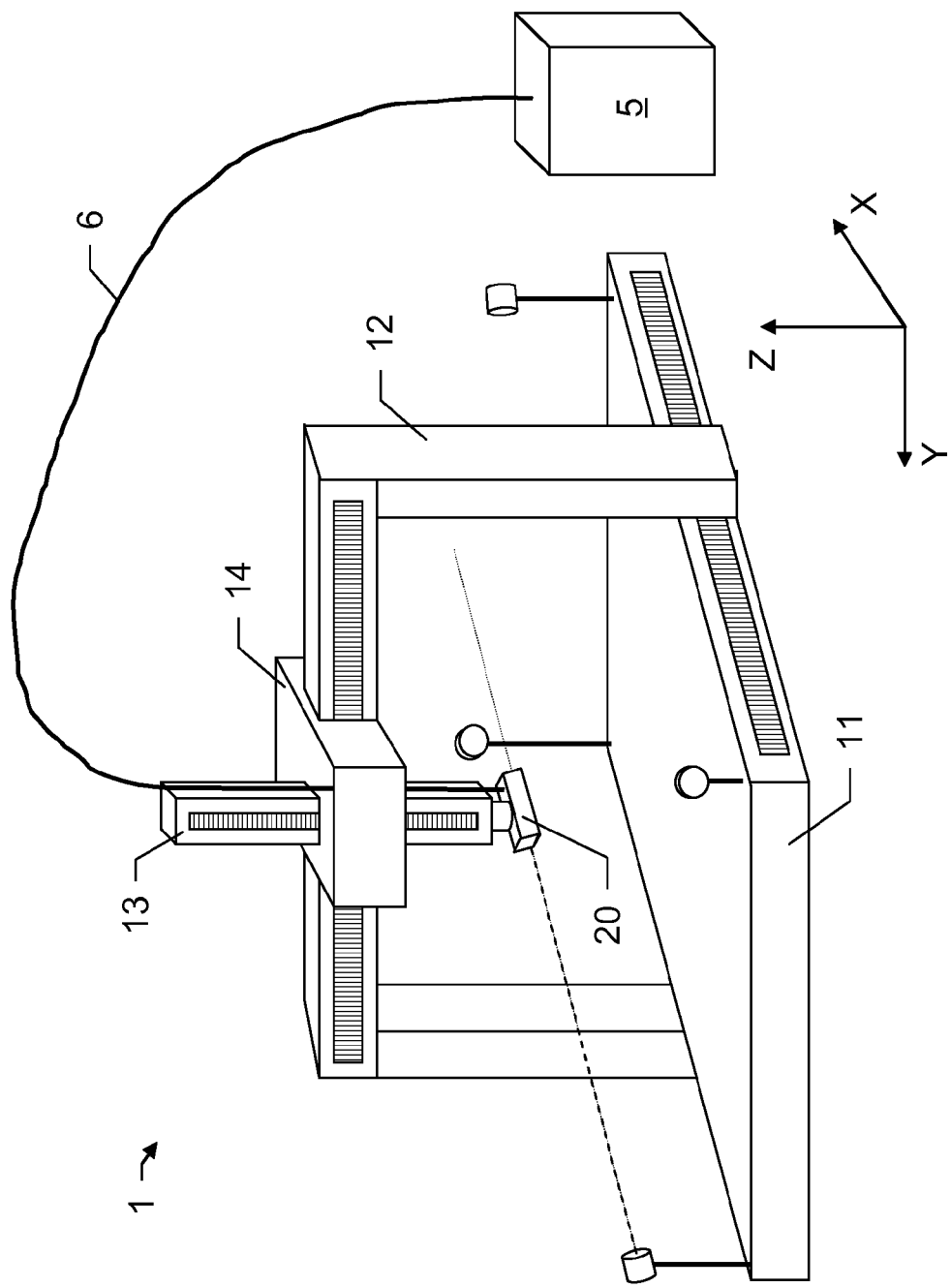
FIG. 2 shows a second embodiment of a portal coordinate measuring machine with a calibration laser head and reflectors at the base according to the invention, wherein a supply unit is provided separately from the CMM.

FIG. 2 shows a CMM 1 substantially corresponding to the CMM 1 shown in FIG. 1, wherein machine components (except of the calibration laser head 20) correspond to those of FIG. 1, wherein here only reference numbers are shown for such components which are mentioned in the following remarks to FIG. 2.

The system shown in FIG. 2 comprises an external supply unit 5 (structurally separated from the CMM 1) which is implemented to generate laser light being used for above described calibration of the CMM 1. Thus, the supply unit 5 comprises a laser light generator. The laser light is transferred to the calibration laser head 20 by an optical fibre 6, i.e. the optical fibre 6 is connected to the supply unit 5 and to the CMM 1, particularly to the laser head 20 which comprises an interferometer for measuring changes in distances by means of the supplied laser light.

According to a further embodiment of the invention, the supply unit 5 is implemented to measure the changes in distance to the reflectors interferometrically, i.e. the supply unit 5 comprises a beam separation as part of the two arms of an interferometer for measuring such changes in distance. According to that embodiment the calibration laser head 20 is part of the interferometer, but the laser light of the two arms is guided via the optical fibre 6 to the calibration laser head 20, wherein one beam is directed by means of the laser head 20 to one of the reflectors, reflected at the respective reflector, received on side of the laser head 20, wherein the second beam is reflected internally inside of the calibration laser head and both beams are guided back to the supply unit 5 via the fibre 6 or are detected superimposed inside of the calibration laser head. Alternatively, only the light of the first arm is guided via the optical fibre 6 to the calibration laser head 20 and a reference beam is provided by the second beam being guided along an alternative path.

On side of the supply unit 5, i.e. by the interferometer, the reflected laser light is superimposed with a reference laser light in order to provide an interference signal for enabling determination of changes in distance to the reflector when moving the calibration laser head 20 for calibration of the CMM 1.

Regarding the guidance (transmittance) of the laser light to and from the CMM 1, the optical fibre 6 may be connected directly to the calibration laser head 20 or may be connected to the Z-ram 13 (or any other component 11,12,14 of the CMM 1), wherein the laser light is guided further inside the Z-ram 13 (or the any other component 11,12,14 of the CMM 1) to the calibration laser head 20. Particularly, the optical fibre 6 extends along the Z-ram 13 up to the laser head 20.

Figure 3:
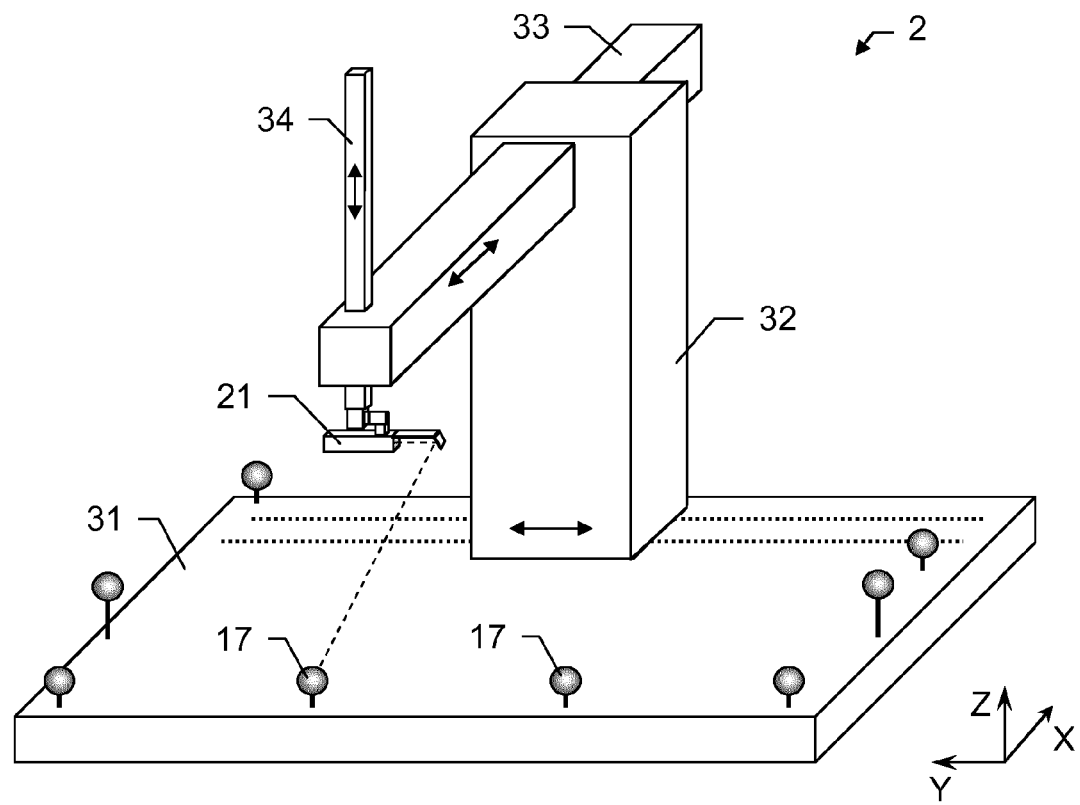
FIG. 3 shows a further embodiment of a coordinate measuring machine with calibration laser head and reflectors according to the invention.

FIG. 3 shows a second exemplary embodiment of a coordinate measuring machine 2 (CMM) according to the invention, wherein the coordinate measuring machine 2 comprises a base 31 and components 32,33,34 for providing movability of the tool carrier in three directions (X-, Y- and Z-direction) relative to the base 31. For this reason, the components 32,33,34 are moveable relative to each other by drive mechanisms (not shown) linking the three components 32,33,34 and the base 31.

A calibration laser head 21 is attached to the tool carrier and designed so that a laser beam, which is emittable by the calibration laser head 21, is swivelable around at least two basically perpendicular axes. The calibration laser head comprises an interferometer for measuring changes in distance to a target. The laser beam is emitted around the tool centre point. An offset of the laser beam from at least the Z-ram axis is provided by the design of the calibration laser head 21.

The machine 2 further comprises a set of targets in form of reflectors 17 being positioned at defined and pre-known positions onto the base 31. Particularly, the reflectors 17 are located near the border of the base 31 (or the measuring volume, respectively) and in different positions regarding the respective Z-coordinates in order to provide a calibration of the CMM 2 with respect to all degrees of freedom defined by the movable parts of the CMM 2.

Moreover, the coordinate measuring machine 2 comprises a specified calibration functionality adapted to generate calibration data for compensating machine errors according to the invention. Within the frame of the calibration functionality the laser beam emitted by the calibration laser head 21 is directed onto a first of the reflectors 17. The direction defined by targeting the first reflector 17 defines a first linear measuring path along which several measuring point are to be determined.

The determination of respective measuring points comprises on the one hand a measurement of distance, i.e. change in distance, to the reflector 17 at each measuring point and on the other hand receiving machine coordinates (at least X, Y and Z) for the position and orientation of the calibration laser head 21 (i.e. the positions of the movable parts of the CMM 2) for each measuring point. The change in distance to the respective reflector 17 is determined by the interferometer of the laser head 21.

For passing through the measuring points, the calibration laser head 21 is moved along the first measuring path by respective movements of the frame components 32,33,34, in particular wherein the orientation of the tool carrier and/or the laser head 21 is adapted accordingly.

After finalising the measurements along the first measuring path, the laser beam is directed onto a second reflector 17 of the set of targets and again a defined amount of measuring point along a second measuring path (defined by the position of the second reflector and the orientation of the laser beam) is measured with respect to measuring distances and gathering machine coordinates. That process is repeated for a predefined amount of reflectors 17 and according to a desired amount of measuring paths defined by each reflector and respective beam orientations.

As a measuring result of the calibration procedure a set of data (calibration data) is generated comprising for each measuring point the machine coordinates provided by the CMM 2 and corresponding distance information (change of distance to a reflector with respect to a previous measuring point).

By processing the calibration data a compensation rule for the CMM 2 is derivable, which describes occurring measurement errors. Such a compensation rule may provide a mathematical correction of measured machine coordinates due to occurring static and/or dynamic machine deformations. Alternatively, a compensation map is derived providing compensated measuring values for respective coordinates, which were determined by measuring an object with an optical probe or with a touch probe attached to the tool carrier. Furthermore, a model which describes the machine behaviour may be derived or adapted based on the calibration data.

The calibration data comprises information about structural deformations of the CMM 2 for different positions of machine components.

According to a specific embodiment of the invention, the laser light, which is emitted at the calibration laser head 21 and used for distance measurements with the interferometer, is generated with an external laser source and transmitted to the laser head 21 via an optical fibre which connects the laser head 21 with the laser source. Thus, the laser source is positioned structurally separated from the CMM 2. Advantageously, by such an arrangement the structure of the CMM 2 is not influenced e.g. by heat occurring at the laser source.

Preferably, the number of reflectors 17 and their positions relative to or onto the base 31 are chosen so that the calibration process can be run fully autonomous with providing accurate compensation data for the whole measurement volume. After giving a starting command the calibration process is executed on side of the CMM 2 (controlled by a controlling and processing unit of the CMM 2) automatically, i.e. the laser beam is successively directed onto each reflector automatically and respective measuring points along the measuring paths are determined.

Figure 4:
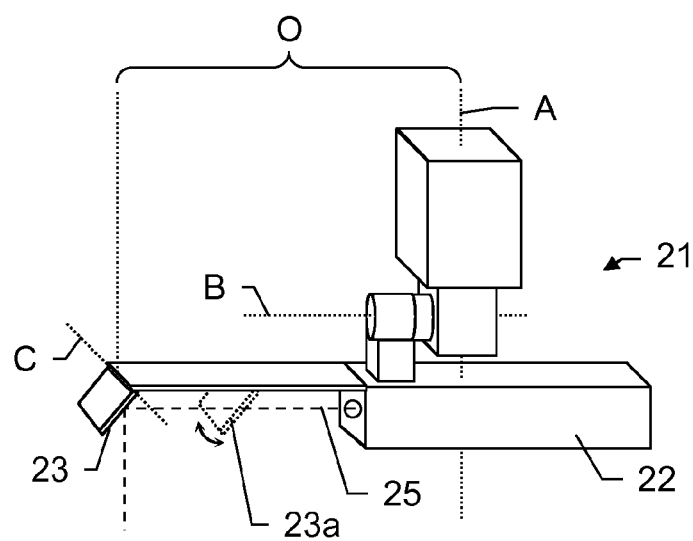
FIG. 4 shows a calibration laser head according to the invention.

FIG. 4 shows a calibration laser head 21 according to the invention. The calibration laser head 21 comprises a laser light emission unit 22 providing laser light (the laser light may be provided by an external laser generator via an optical fibre) for an integrated interferometer for measuring changes in distance to objects by emitting a laser beam 25 and directing the beam 25 onto the object to be measured. The calibration laser head 21 is constructed to be pivotable around two axes A and B by rotation means which allows an orientation of the emitted laser beam 25 in two degrees of freedom.

Moreover, the calibration laser head 21 comprises a reflecting member 23, e.g. a mirror, for deflecting the laser beam 25 according to an angular position of the mirror with respect to the laser light emission unit 22.

The reflecting member 23 preferable being arranged rotatable (motorised) around a third axis C and thus providing setting a third degree of freedom of the orientation of the laser beam 25.

The reflecting member 23 (mirror) provides directing the beam in a direction that is finally needed for the compensation (the calibration laser head also could be mounted vertically, wherein a torque on the Z-axis may be generated). Moreover, it generates a needed offset O (at least from the axis A) to allow a more precise measurement of pitch and of roll.

The shown calibration laser head 21 enables to direct the laser beam with respect to three rotatory degrees of freedom.

According to a specific embodiment of the calibration laser head 21, a second mirror 23a (or more mirrors—not shown here) is arranged at the laser head 21 closer to the emission unit 22 being swivelable (around an axis parallel to the C-axis) into the laser beam path and provides reduction of occurring offsets O with view to the calibration process. With such two mirrors 23,23a, wherein at least the one 23a closer to the emission unit 22 being swivelable, it makes it possible to automatically change the offset O to improve the quality of the collected compensation information.

According to a further specific embodiment of the calibration laser head 21, the centre of gravity of the laser head 21 is basically aligned with the Z-Ram axis (axis A) of a CMM. When rotating around the horizontal axis (axis B) of the head 21, a torque will be generated on the quill, what can be reduced by adding some counterweight on the laser head 21.

According to yet another specific embodiment of the calibration laser head 21 (not shown), the beam separation of the two interferometer arms may not be implemented directly with the calibration laser head 21 but is located structurally separated of it, wherein measurement laser light is transmitted to and from the interferometer e.g. via an optical fibre or by an alternative beam path. The calibration laser head 21 then mainly provides precisely directing the measuring beam 25 for providing designated distance measurements.

However, to avoid a possible influence of the optical (glass) fibre on the accuracy of the measurement, the reference surface (of an interferometer) may be kept in the calibration laser head 21. By doing so, the thermal and mechanical expansion of the fibre can be reduced and have less influence on the calibration result.

Figure 5:
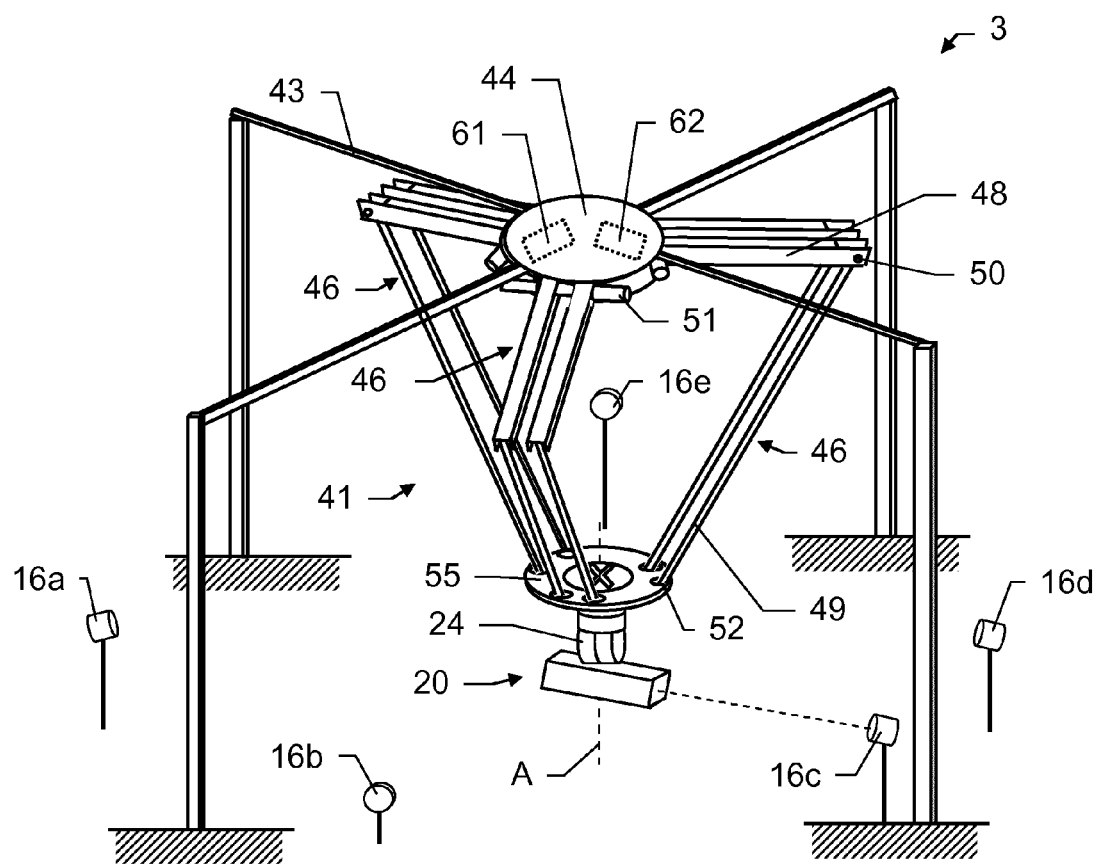
FIG. 5 shows a further embodiment of coordinate measuring machine according to the invention having a Delta Robot as a supporting structure.

FIG. 5 shows a coordinate measuring machine 3 (CMM) according to the invention having a Delta Robot 41 as a supporting structure.

The Delta Robot 41 comprises a stationary frame 43 supporting a stationary base 44, and three arms 46, also called kinematic chains. The frame 43 is usually a massive construction, but presented here filigree and only schematic in order to show details of the Delta Robot more clearly. Each arm has two parts 48, 49, which are linked by a middle joint 50. The first part 48 of each arm 46 is connected by first joints 51 to the stationary base 44 and with their second parts 49 by second joints 52 to an end effector 55. The end effector 55 in this case is built in form of a circle like plate supporting a tool, a probe or—as shown here—a calibration laser head 20. The end effector 55 is configured in a way that the tools, probes or the laser heads 20 are interchangeable. The calibration laser head 20 is designed as laser interferometer. To also provide the compensation of the roll or of the pitch (errors), an offset from the A-axis, which is defined by the effector 55, is needed. Such offset can be applied e.g. by use of a calibration laser head shown in FIG. 4.

In this example a control unit 61 and an analysing unit 62 are arranged in the stationary base 44 of the Delta Robot 41. However, the control unit 61 and an analysing unit 62 can be located externally in a computer as well, which can be connected to the Delta Robot 41 by wired or wireless communication means (not shown). As usual, the joints are provided with angle encoders (not shown) in order to deliver according angle signals, so that the current position of the end effector 55 and of the calibration laser head 20 can be derived and used by the analysing unit 62 and the control unit 61. The control unit 61 controls the movement of the end effector 55 with the laser head 20 within the motion zone having three degrees of freedom (lateral in x-, y-, z-directions) by means of actuators (not shown) in a known manner by using the signals/data delivered by the angle encoders and particularly by additionally using the signal/data delivered by acceleration sensors for determining the current position of the laser head 20 more precisely.

Additionally, an orientation of the calibration laser head 20 at the end effector 55 is determinable by corresponding encoders located at pivoting means 24 connecting the laser head 20 with the end effector 55.

Of course the CMM 3 is, as known in the state of the art, provided with input means (not shown) and with output means (not shown), e.g. in form of a display or monitor and optionally a loud speaker for acoustic warning connected to the analysing unit 62 for presenting the results to the user. Further as known there is an input means for enabling the user to manipulate the CMM 3. Those means can be integrated in the CMM 3, e.g. in the stationary base 44 or they can be built as an external unit (not shown) or integrated in a computer (not shown) and connected to the CMM 3 by wire or wireless in well known manner.

For providing accurate coordinate measurements with the CMM 3 the machine has to be calibrated like other CMM-systems known from prior art also have to. According to the invention, the CMM 3 comprises functionality for executing the calibration with help of the calibration laser head 20 and the retro-reflectors 16a-e.

In context of the calibration of the CMM 3 following steps are performed:

The calibration laser head 20 is orientated so that the emitted laser beam impinges onto a first 16c of the set of retro-reflectors 16a-e. According to that laser beam orientation a linear measuring path along the laser beam is defined.

Now, the calibration laser head 20 is moved along the measuring path by proving respective movement with the Delta Robot 41 structure. With help of the Delta Robot 41 and the pivoting means 24 the laser beam is kept directed onto the reflector 16c and the reflected laser beam is received by the laser head 20.

While moving the laser head 20, continuously, changes in distance to the reflector 16c are measured by the interferometer provided by the laser head 20. Moreover, machine coordinates referring to respective positions of the end effector 55 or of the calibration laser head 20 are derived based on the signals of the machine encoders.

The measurements of changes in distance are assigned to respective machine coordinates, i.e. for designated points along the measuring path information about a distance (a change in distance, respectively) to the reflector 16c and machine coordinates is provided. Hence, calibration raw data describing the structural behaviour and deformations of the CMM 3 for positioning the end effector 55 within the measuring volume is produced.

Calibration of the CMM 3 is performed by extracting the CMM errors by comparing the measurement results (machine coordinates) to an accurate reference (measurements of changes in distance) and generating a corresponding compensation map based thereon. That compensation map is then used to correct all future measurements.

Although the invention is illustrated above, partly with reference to some specific embodiments, it must be understood that numerous modifications and combinations of different features of the embodiments can be made and that the different features can be combined with calibration principles and/or coordinate measuring machines known from prior art.

What is claimed is:

1. A calibration method for a coordinate measuring machine, the coordinate measuring machine comprising:
a drive mechanism for moving a tool carrier relative to a base for approaching a measurement point; and
a calibration laser head implemented so and attached to the tool carrier so that a laser beam, which is emittable by the calibration laser head, is swivelable around at least two basically perpendicular axes and changes in distance are measurable interferometrically by means of the calibration laser head, wherein a set of retro-reflectors is arranged in fixed positions relative to and/or onto the base;

the method comprising:
emitting and directing the laser beam towards a first of the set of retro-reflectors, whereby a measuring path is defined by the orientation of the laser beam;
moving the calibration laser head along the measuring path so that the laser beam is kept directed towards the first retro-reflector according to the measuring path and the reflected laser beam is continuously received at the calibration laser head;

measuring the change in distance to the first retroreflector at a plurality of measuring positions along the measuring path, gathering a machine position for each of the plurality of measuring positions, the machine position relating to a position of the tool carrier relative to the base, wherein machine coordinates corresponding to drive positions of the drive mechanism are gathered, and deriving calibration data for the coordinate measuring machine depending on the measured change in distance and the machine position for each of the plurality of measuring positions.

2. The calibration method according to claim 1, wherein:
calculating a compensation map based on the measured change in distance and the machine position for each of the plurality of measuring positions for compensating a position information which is determined for the at least one measurement point, wherein the compensation map provides deriving compensated position values for respective machine positions which are gathered by conducting a measuring mode.

3. The Calibration method according to claim 1, wherein:
an automatic laser aligning functionality is executed, wherein an impinging position of the reflected laser beam on side of the calibration laser head is determined and the position and/or orientation of the calibration laser head is adapted based on the impinging position, wherein the position and/or orientation of the calibration laser head is adapted so that the laser beam impinges on the centre of the respective retro-reflector.

4. The calibration method according to claim 1, wherein:
the measuring path defined by the direction of the laser beam provides a defined offset regarding at least one of the two axes.

5. The calibration method according to claim 1, wherein:
the direction of laser beam is adjusted with respect to three rotatory degrees of freedom.

6. The calibration method according to claim 1, wherein:
the calibration method is performed in a dynamic manner, wherein the steps of measuring the change in distance to the first retro-reflector and gathering the machine position for each of the plurality of measuring positions are performed while moving the calibration laser head or in a static manner, wherein the steps of measuring the change in distance to the first retro-reflector and gathering the machine position for each of the plurality of measuring positions are performed at defined rest positions of the calibration laser head, or in a hybrid manner, wherein the calibration method is performed in the dynamic manner for a first part of the plurality of measuring positions and in the static manner for a second part of the plurality of measuring positions.

7. The calibration method according to claim 1, wherein:
the position of at least one reflector of the set of 15 retro-reflectors is pre-known.

8. The calibration method according to claim 1, wherein:
the calibration method is performed automatically after providing a starting command, wherein the method steps are performed in autonomously controlled manner.

9. The calibration method according to claim 1, wherein:
deriving a set of compensation values for a set of positions within a measuring volume, the measuring volume representing a particular volume inside which a spatial coordinate of the measurement point is determinable as to a design of the coordinate measuring machine, wherein a position information which is determined for the at least one measurement point is compensable by applying respective compensation values, and/or defining a compensation model and/or deriving a compensation equation based on the measured change in distance and the machine position for each of the plurality of measuring positions, wherein the position information which is determined for the measurement point, is fed to the compensation model or is processed using the compensation equation, respectively, and a compensated position information is derived from the compensation model or by applying the compensation equation respectively.

10. The calibration method according to claim 1, wherein:
the calibration laser head is supplied with laser light for emitting the laser beam via an optical fibre which is connected to the calibration laser head, wherein a laser source for generating the laser light is located structurally separated from the coordinate measuring machine and is connected to the optical fibre.

11. The calibration method according to claim 1 wherein:
an interferometer is associated with the calibration laser head for providing interferometric measurements of the changes in distance, wherein the interferometer is linked to the calibration laser head by a beam path, and/or the calibration laser head comprises an interferometer for measuring the changes in distance interferometrically and/or the calibration laser head comprises a reference surface providing a reference arm of an interferometer, wherein an interference for measuring the changes in distance is generated by superimposing a reference laser beam of the reference arm and the reflected laser beam, wherein the reference and the reflected laser beam are superimposed externally.

12. The calibration method according to claim 1 wherein:
performing the method steps for at least the first and a second or more of the reflectors of the set of retro-reflectors, wherein the calibration data is derived on basis of the measurements of change in distance and the gathered machine position for each of the plurality of measuring positions for the at least first and second or more retroreflectors, and/or performing the method steps repeatedly with directing the laser beam towards the same of the set of retro-reflectors, wherein different measuring paths are defined by respective different orientations of the laser beam, and/or the laser beam being emitted at a tool centre point defined by the arrangement of the calibration laser head to the tool carrier, wherein the tool centre point is defined by a centre of rotation regarding swiveling the calibration laser head, or the laser beam respectively, around the at least two axes.

13. A non-transitory computer product having computer-executable instructions for controlling and executing the method of claim 1.

14. A coordinate measuring machine for determining position information for at least one measurement point of an object to be measured, comprising:
a drive mechanism for moving a tool carrier relative to a base for approaching the measurement point, a position providing unit for providing a machine position according to the position of the tool carrier relative to the base and a controlling and processing unit, wherein:
- a calibration laser head is implemented so and attached to the tool carrier so that a laser beam, which is emittable by the calibration laser head, is swivelable around at least two basically perpendicular axes and changes in distance are measurable interferometrically by means of the calibration laser head, a set of retro-reflectors being arranged in fixed positions relative to and/or onto the base and wherein the controlling and processing unit is configured to perform a calibration functionality comprising:
- emit and directing the laser beam towards a first of the set of retro-reflectors, whereby a measuring path is defined by the orientation of the laser beam;
- move the calibration laser head along the measuring path so that the laser beam is kept directed towards the first retroreflector according to the measuring path and the reflected laser beam is continuously received at the calibration laser head;
- measure the change of distance to the first retro-reflector at a plurality of measuring positions along the measuring path; and
- gather the machine position for each of the plurality of measuring positions by the position providing unit, wherein machine coordinates corresponding to drive positions of the drive mechanism are gathered, wherein the calibration functionality generates calibration data, the calibration data depending on the measured change in distance and the machine position for each of the plurality of measuring positions and providing compensation of machine errors.

15. The coordinate measuring machine according to claim 14, wherein:
an optical fibre is provided for transmittance of laser light to the calibration laser head for emitting the laser beam, wherein the laser light is generated by a laser source which is located structurally separated from the coordinate measuring machine and the optical fibre is connected to the calibration laser head and the laser source.

16. The coordinate measuring machine according to claim 14, wherein:
an interferometer is associated with the calibration laser head for providing measuring the changes in distance interferometrically, wherein the interferometer is linked to the calibration laser head by a beam path.

17. The coordinate measuring machine according to claim 14, wherein:
the calibration laser head comprises an interferometer for measuring the changes in distance interferometrically.

18. The coordinate measuring machine according to claim 14, wherein:
the calibration laser head comprises an impinging-detection unit for determining an impinging position of the reflected laser light relative to a reference position of the impinging-detection unit, wherein the impinging-detection unit is designed as a position sensitive detector or a laser power sensor.

19. The coordinate measuring machine according to claim 14, wherein:
the calibration laser head is implemented so and is attached to the tool carrier so that the measuring path defined by the direction of the laser beam provides a defined offset regarding at least one of the two axes.

20. The coordinate measuring machine according to claim 14, wherein:
the calibration laser head is implemented so that the direction of laser beam is adjustable in three rotatory degrees of freedom by means of the calibration laser head.

21. The coordinate measuring machine according to claim 14, wherein:
the calibration laser head is designed being swivelable around the at least two basically perpendicular axes and comprises a reflecting member providing the offset, wherein the reflecting member is designed being swivelable around a third axis which is mutually perpendicular to the at least two perpendicular axes.

22. A system for calibration of a coordinate measuring machine, the coordinate measuring machine being built for determining position information for at least one measurement point of an object to be measured, the coordinate measuring machine comprising:
a drive mechanism for moving a tool carrier relative to a base for approaching the measurement point, and
a position providing unit for providing a machine position according to the position of the tool carrier relative to the base;
the system comprising:
- a calibration laser head implemented so and attachable to the tool carrier so that
- a laser beam, which is emittable by the calibration laser head, is swivelable around at least two basically perpendicular axes, and changes in distance are measurable interferometrically by means of the calibration laser head;
- a set of retro-reflectors being arrangeable in fixed positions relative to and/or onto the base; and
- an optical fibre connectable to the calibration laser head for providing transmittance of laser light to the calibration laser head for emitting the laser beam;
wherein the system further comprises a laser source for generating laser light being transmittable via the optical fibre to the calibration laser head, the laser source being connectable with the optical fibre.

\* \* \* \* \*